United States Patent
Braun, Jr. et al.

(10) Patent No.: US 7,776,243 B2
(45) Date of Patent: Aug. 17, 2010

(54) RECYCLED MATERIALS STRENGTHENING PROCESS, SYSTEM AND PRODUCTS

(75) Inventors: Al Braun, Jr., 350 W. 280 North, Providence, UT (US) 84322; Daryl D. Reavis, Sandy, UT (US); Michael W. Starkweather, Sandy, UT (US)

(73) Assignee: Al Braun, Jr., Koloa Kauai, HI (US)

( * ) Notice: Subject to any disclaimer, the term of this patent is extended or adjusted under 35 U.S.C. 154(b) by 694 days.

(21) Appl. No.: 11/122,883

(22) Filed: May 4, 2005

(65) Prior Publication Data
US 2006/0251829 A1 Nov. 9, 2006

(51) Int. Cl.
*B29C 47/00* (2006.01)
*B29C 59/00* (2006.01)
*B65D 71/00* (2006.01)

(52) U.S. Cl. .................. 264/108; 264/120; 264/122; 264/148; 264/209.1; 264/211; 264/911; 264/913; 264/915; 264/920; 428/2

(58) Field of Classification Search .................. 264/920
See application file for complete search history.

(56) References Cited

U.S. PATENT DOCUMENTS

| | | | |
|---|---|---|---|
| 361,615 A | 4/1887 | Charbonneau |
| 3,671,615 A | 6/1972 | Price |
| 3,892,706 A | 7/1975 | Jetzer |
| 4,098,649 A | 7/1978 | Redker |
| 4,225,640 A | 9/1980 | Erb |
| 4,256,771 A | 3/1981 | Henderson et al. |
| 4,279,790 A | 7/1981 | Nakajima |
| 4,339,363 A | 7/1982 | Nakagima |
| 4,340,347 A | 7/1982 | Robertson |

(Continued)

FOREIGN PATENT DOCUMENTS

EP 0249481 12/1987

(Continued)

OTHER PUBLICATIONS http://www.engr.utk.edu/mse/pages/Textiles/Spunbond%20Technology.htm, Apr. 2004.

*Primary Examiner*—Jeffrey Wollschlager
(74) *Attorney, Agent, or Firm*—Webb IP Law Group; Jason P. Webb; Danny Y. H. Cheng (57) ABSTRACT

A method of forming a reinforced building product from garbage, comprising the steps of sorting garbage, shredding plastics within the garbage, shredding fibers within the garbage, heating the shredded plastics, forming a slurry from the plastics and fibers, disposing the slurry within an extrusion cavity, extruding the fluid through a venturi, and allowing the extruded materials to cool. Garbage is separated into plastics, fibers, and other materials. Plastics are shredded to facilitate melting. Fibers are shredded to macroscopic lengths no greater than a maximum internal diameter of a venturi. The plastics are melted. The melted plastics are mixed with fibers and other material to form a slurry that is extruded from a cavity through a venturi, thereby causing significant alignment of the shredded fibers within the slurry in an outer region of the extruded slurry. Cooled, there is reinforced building material.

7 Claims, 9 Drawing Sheets

U.S. PATENT DOCUMENTS

| | | | |
|---|---|---|---|
| 4,894,192 A | | 1/1990 | Warych |
| 4,968,463 A | | 11/1990 | Levasseur |
| 5,075,057 A | | 12/1991 | Hoedl |
| 5,082,605 A | | 1/1992 | Brooks et al. |
| 5,088,910 A | * | 2/1992 | Goforth et al. ............... 425/142 |
| 5,096,046 A | | 3/1992 | Goforth et al. |
| 5,096,645 A | * | 3/1992 | Fink ........................... 264/137 |
| 5,141,700 A | | 8/1992 | Sze |
| 5,217,655 A | | 6/1993 | Schmidt |
| 5,273,819 A | * | 12/1993 | Jex ........................ 428/299.1 |
| 5,417,904 A | | 5/1995 | Razi et al. |
| 5,474,722 A | * | 12/1995 | Woodhams ................ 264/45.3 |
| 5,503,788 A | * | 4/1996 | Lazareck et al. ............. 264/115 |
| 5,759,680 A | * | 6/1998 | Brooks et al. ................ 428/326 |
| 5,827,611 A | * | 10/1998 | Forbes ........................ 428/375 |
| 5,891,374 A | * | 4/1999 | Shah et al. .................. 264/108 |
| 5,925,296 A | | 7/1999 | Leese |
| 6,017,475 A | | 1/2000 | Cantrell |
| 6,109,066 A | | 8/2000 | Loubinoux et al. |
| 6,117,924 A | | 9/2000 | Brandt |
| 6,228,301 B1 | | 5/2001 | Taguchi et al. |
| 6,253,527 B1 | | 7/2001 | De Zen |
| 6,306,318 B1 | * | 10/2001 | Ricciardelli et al. ...... 264/37.32 |
| 6,528,009 B1 | | 3/2003 | Barchena |
| 6,844,040 B2 | * | 1/2005 | Pabedinskas et al. ..... 428/36.91 |

FOREIGN PATENT DOCUMENTS

| | | |
|---|---|---|
| EP | 0401885 | 12/1990 |
| GB | 1423788 | 2/1976 |
| JP | 10290969 | 11/1998 |

* cited by examiner

RECYCLED MATERIALS STRENGTHENING PROCESS, SYSTEM AND PRODUCTS

BACKGROUND OF THE INVENTION

1. Field of the Invention

The present invention relates to products made from recycled materials, in particular to a process for making stronger products from recycled materials in a municipal waste stream specifically using a venturi extrusion methodology.

2. Description of the Related Art

Municipal waste has become a serious problem in western society. Large fleets of trucks are used to transport the waste products of modern living to landfills on the edge of every modern city. The requirement for landfills is eating up increasingly large sections of land that could be used for other purposes. There is also the tremendous amount of recyclable material that is not being recycled. There is a very critical need to utilize this vast resource and at the same time save the "waste" land that is now being used as landfills.

There have been numerous attempts to create useful products from recycled materials. The main components in the majority of them have been waste wood and plastics. The methodologies utilized include injection molding and extrusion.

In current processes for making products from recycled materials the main problem has been the lack of strength of the final product. If the products are to be used for such applications as railroad ties, where immense pressures are applied, then the strength of the final product must be very high. However with the current methodologies most recycled building products lack sufficient tensile strength to be used for load bearing purposes.

Recycled products that have not been strengthened usually can only be used for decorative purposes due to lack of tensile strength. The exceptions are typically recycled wood based products. Without sufficient tensile strength the products will shear or bend easily. Therefore most current recycled products cannot be uses for construction beams, unsupported spans, railroad ties, etc, where greater strength is necessary.

What is needed is some method for improving the strength of recycled products that solves one or more of the problems described herein.

SUMMARY OF THE INVENTION

The present invention has been developed in response to the present state of the art, and in particular, in response to the problems and needs in the art that have not yet been fully solved by currently available methods for recycling waste materials. Accordingly, the present invention has been developed to provide a methodology for strengthening the final products and thus make them more useful.

In one embodiment of the invention there may be a method of forming a reinforced building product from garbage, comprising the steps of sorting garbage, shredding plastics within the garbage, shredding fibers within the garbage, heating the shredded plastics, forming a slurry from the plastics and fibers, disposing the slurry within an extrusion cavity, extruding the fluid through a venturi, and allowing the extruded materials to cool. Sorting the garbage may be by separating the garbage into plastics, fibers, and other materials. Shredding the plastics may be to a size configured to facilitate melting. Shredding the fibers may be to macroscopic (visible by the unaided human eye) lengths no greater than about a maximum internal diameter of a venturi. Heating the plastics may be to a temperature sufficient to substantially melt the plastic. Forming a slurry may be by mixing the heated plastic and the fibers. Disposing the slurry within an extrusion cavity may be wherein the extrusion cavity includes an extrusion piston and the venturi. Extruding the slurry through the venturi may be by actuating the extrusion piston, thereby causing significant alignment of the shredded fibers within the slurry in an outer region of the extruded slurry. Allowing the extruded slurry to cool and harden may thereby form reinforced building product material.

In another embodiment, there may be sorting the other materials into fillers and unusables, shredding the fillers, and mixing the fillers with the heated plastic and the fibers. There may be wherein the fillers, heated plastic, and fibers are mixed according to the following ranges: from about 30 percent to about 60 percent of heated plastic, from about 0 percent to about 35 percent of fibers, and from about 30 percent to about 60 percent of fillers. There may be a step of sanitizing the fibers. The venturi may be a pipe venturi configured to produce hollow reinforced building product material. There may be a step of cutting the reinforced building product material to a desired length. There may be a step of sanitizing the fibers and the fillers. The fibers may include metal wires.

In still another embodiment there may be a step of repeating the method a second time using the reinforced building product material resultant from a first time as a core upon which to form a layer of reinforced building product material disposed thereupon by a pipe extruder including a pipe venturi.

In yet still another embodiment there may be an apparatus for producing reinforced building material. The apparatus may include a sorter, a shredder, a mixer, a heater, an extruder, a controller, a venturi, and/or a cooling system. There may also be a sanitizer and/or a cutter. The sorter may be configured to sort garbage into plastics, fibers, filler, and unusable materials. The shredder may be configured to receive materials from the sorter and to shred plastics and filler to a fine consistency and fibers to lengths from about ⅛ inches to about 1 inch. The mixer may be configured to receive and mix shredded garbage. The heater may be configured to melt shredded plastic. The extruder may be in fluid communication with the mixer and configured to extrude fluid received from the mixer. The controller may be configured to control the mixer and the extruder, wherein the mixer is configured to mix plastic, filler, and fibers. The venturi may be in fluid communication with the extruder configured to cause substantial alignment of shredded fibers in an outer region within a fluid being extruded through the venturi. The cooing system may be configured to cool fluid after it is extruded through the venturi. The sanitizer may be configured to heat fillers and fibers to a sufficient temperature for a sufficient duration to sanitize the fillers and fibers. The cutter may be configured to cut extruded and cooled materials.

In still yet another embodiment, the venturi may be a pipe venturi configured to produce hollow reinforced building product material. The shredder may be configured to receive metal wire and to cut metal wire to lengths of about ⅛ of an inch to about 1 inch. The apparatus may be configured to receive reinforced building material from a second apparatus and coat the reinforced building material of the second apparatus. The heater may be configured to melt plastics with a melting point greater than about 500 degrees Fahrenheit.

In still yet another further embodiment, there may be a reinforced building material that may include from about 30 percent to about 60 percent plastics, about 0 percent to about 35 percent filler material, and about 30 percent to about 60 percent macroscopic fibers, wherein the macroscopic fibers may be substantially aligned perpendicular to an outer surface of the reinforced building material in an outer region. The macroscopic fibers may include metal wires. There may be a hollow core substantially central to the reinforced building material and extending laterally therethrough, thereby forming a reinforced pipe. There may be a second outer layer wherein the macroscopic fibers are substantially aligned perpendicular to an outer surface of the reinforced building material in a second outer region of the second outer layer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Figure 1:
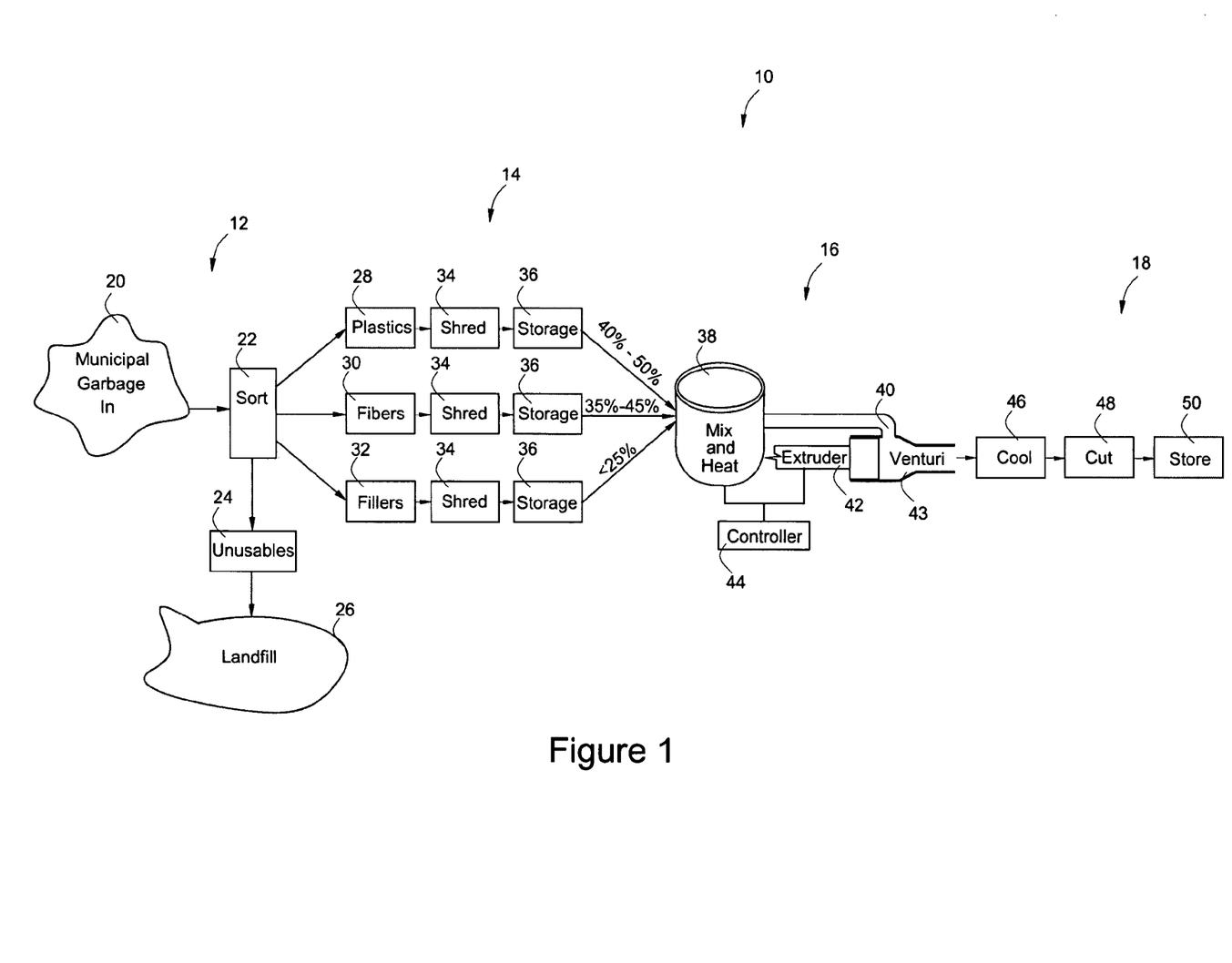
FIG. 1 is a flow diagram of a process of converting recyclable municipal wastes into useful building products according to one embodiment of the invention.

FIG. 1 is a flow diagram of a process of converting recyclable municipal wastes into useful building products according to one embodiment of the invention. The portion 12 shows municipal garbage 20 being sorted 22 into plastics 28, fibers 30, fillers 32 and unusables 24. The process preferably includes strict sorting of the garbage 20. The sorting process may be very labor intensive. Several devices may be used to reduce the labor required to some degree. These devices may include, but are not limited to, bag breakers, high intensity magnets and heavy grapple arms.

Purposes of sorting may include eliminating unusable materials and to permitting standardized final products. Certain items found in the input stream may not be usable due to their volatile, unwieldy or physical nature. Examples of this might be decaying objects, hazardous chemicals, solid objects that are not "digestible" by the chopping machine and materials, such as rubber, that may detract from the final product. The unusable material 24 is typically sent to the landfill 26.

In portion 14, the resulting useful material categories of plastics 28, fiber 30 and filler 32 are then shredded 34. Shredding has a different purpose for each of the components. Products would not be as useful with large filler pieces, sheets of fiber and/or unmelted plastics. Details regarding the shredding of fibers, fillers and plastics are presented below.

The length of the fibers may range from very short yet still macroscopic (visible to the naked eye) to about the size of the extruder cavity. A more moderate range would be from about ⅛" to about 2" after chopping. Preferably they should range from about ½" to 1". Typical fibers are paper, leaves, cardboard, wood, fiberglass and wire. Fibers are defined as any material that has a degree of tensile strength when in strands significantly longer in one dimension than in others. This would include most fibrous organic materials, especially materials with wood fibers. The tensile strength of the fiber particle contributes to strength of the final product. A very small fiber length may contribute little to the strength of the final product. A very long fiber length may contribute strength, but may be harder to process. The length ranges stated above seem to work best in production, when using a 150 ton ram piston extruder and making products that are approximately the size of railroad ties(7"×9"×9').

The plastic is chopped to a fine consistency to permit quick melting when heat is applied. Plastic preferably is the "glue" that hold the final product together. A typical garbage input stream does not usually have sufficient quantities of plastic, in proportion to the fiber and filler that is available. Alternatively extraneous fiber and filler may be sent to the landfill to create a sufficient ratio of plastic. In addition, some high tech plastics are not usable in some embodiments of the invention because of their high melting temperature.

Filler should be ground to sand sized particles. Filler is typically the weakest component of the final product. It is indeed possible to eliminate filler from the process, if sufficient plastic and fiber are available. Typical fillers include sand, rock, and cement. A purpose of filler is to provide bulk and be a partial substitute for more critical components, thereby making the final product more economical The shredded material may then be stored in bins 36 for later use. The shredded materials are typically stored until sufficient amounts are present wherein they may be mixed in the proper proportions to achieve consistent final products. Materials should be stored in conditions sufficient to maintain valued properties of the materials. For example, stored fibers should be kept free from materials and/or conditions that may weaken the fibers.

In portion 16, the shredded materials are mixed 38 in proportional ranges. Plastic content can range from about 25% to about 75%. Fiber content can range from about 25% to about 60%. Filler should not exceed about 25%. The typical range for the plastics and the fibers is about 35% to about 50%. Ideally plastics would be about 45% and fibers would be about 40%. As has been mentioned previously, the product could be made without fillers. Greater strength is achieved by using more fibers, and to a degree, more plastics. Also, a high plastic content may create a product that is more waterproof and that has a surface sheen.

The mixed shredded materials may then be heated 38 to a temperature sufficient to substantially melt the shredded plastics. This temperature is typically from about 340° F. to about 360° F. Heating also serves to sanitize the garbage components. In another embodiment, the plastics may be heated to a higher temperature of about 550° F., before mixing. The higher temperature may more completely melt a greater portion of the plastics. The fiber/filler mix may be heated separately from the plastics and may then only need to be heated to about 170° F. for sanitization. It is possible that the fiber/filler mix need not be heated at all. The high temperature of the plastics could be relied on to perform sanitization. However this may cause problems where for example the final mix may cool too fast.

When the molten mixture has reached a desired temperature, it may be caused to flow through a pipe 40 into the cavity of an extruder 42, which, using the force of the extruder piston, pushes the molten mixture through a venturi 43. This process may be orchestrated by a controller 44. The controller may be a computerized industrial control unit that is programmed to control the production cycles. The controller 44 may be linked to more than one portion of the process. The controller 44 may acquire data from one or more portions of the process and may control one or more portions of the process. There may be more than one controller.

Portion 18 shows the final stage after the extruder and venturi. The solidifying product may cool 46 due to convection. When it has cooled sufficiently to have strength integrity, may be cut to length 48. An example of a product might be a railroad tie that would be cut off to a length of 9 feet. The product can then be stored 50 in conditions similar to other building products. Temperatures under 150° and moderate moisture should not affect the product.

Figure 2:
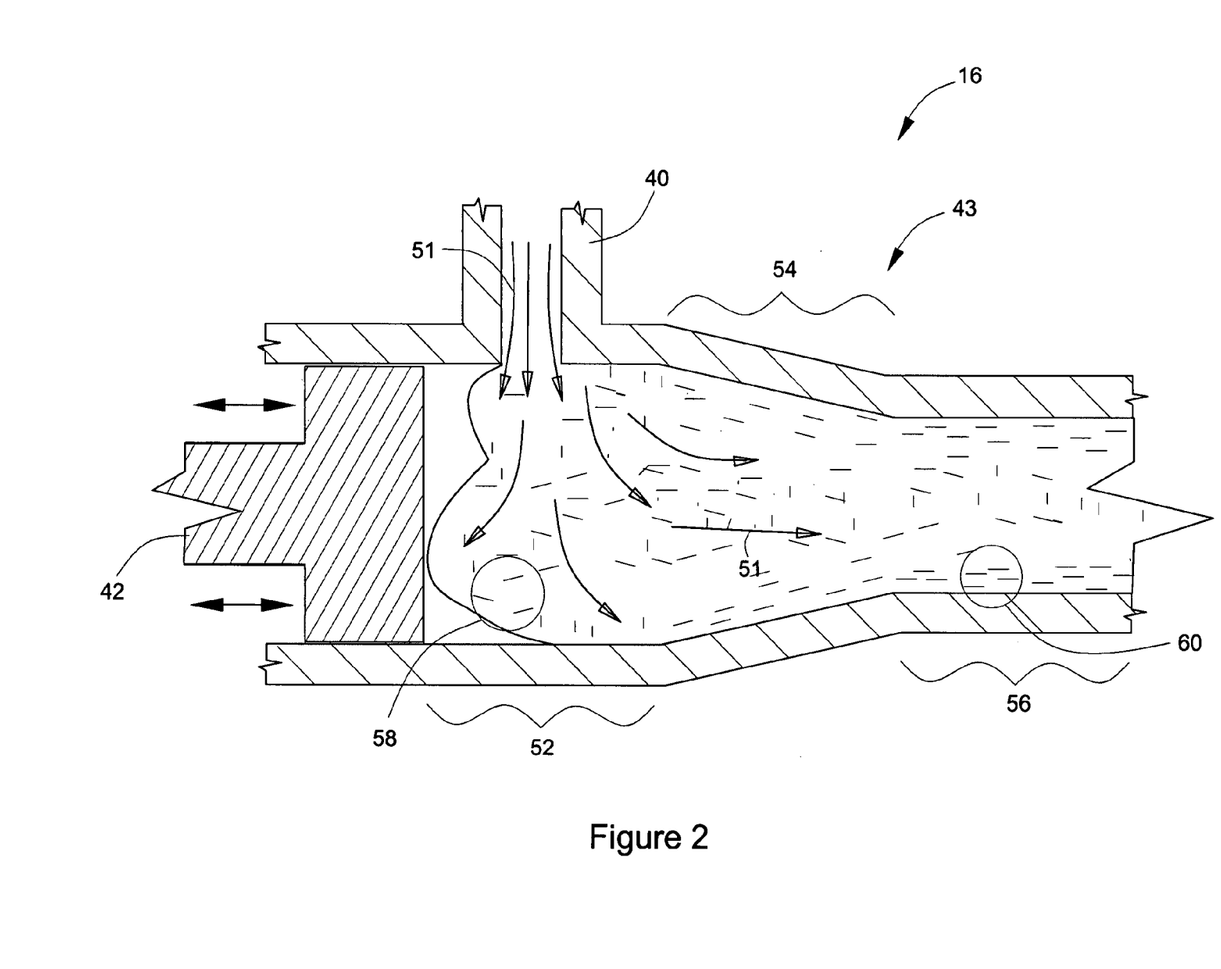
FIG. 2 illustrates a cross sectional side view of an extruder, having a molten slurry extruded there through according to one embodiment of the invention.

FIG. 2 illustrates a cross sectional side view of an extruder, having molten slurry extruded therethrough according to one embodiment of the invention. The illustration shows an aligning of the fiber particles 60 close to the surface of an extruded product. This is due at least in part to the constricting of the flow of material by the venturi. In section 52, the molten mixture flows 51 into the extruder cavity 40 forming an uneven mass 58. When the extruder piston 42 cycles inward, the slurry 51 is forced through section 54. Lubrication, including but not limited to extruder oil and/or vegetable oil, may be added on the outside surfaces of the cooling product to prevent binding in the tube. The venturi shape 43 of the casing constricts the flow with the resulting aligning of the fibers 60 as shown in section 56. The aligning of the fibers in a longitudinal fashion strengthens the final product to a significant degree. The most significant strength contribution is to tensile (stretching or bending) strength. The randomly oriented particles in the center remain strong protection against compressive forces.

Figure 3:
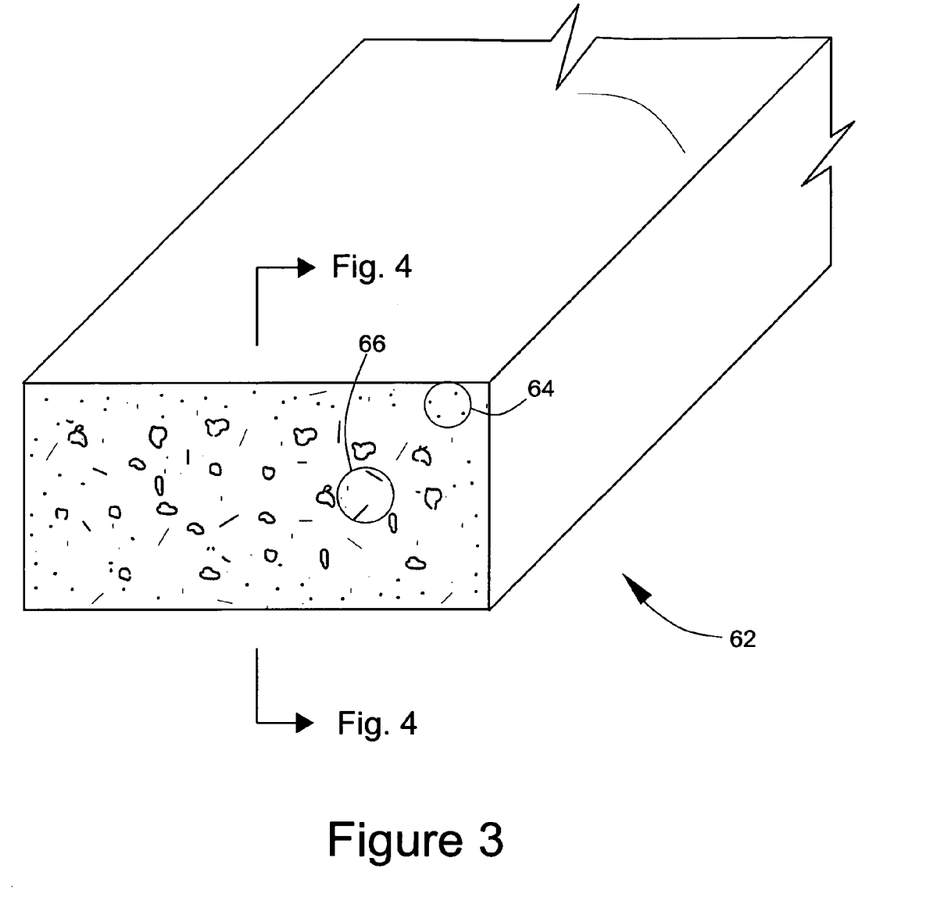
FIG. 3 illustrates a cross sectional side view showing a general longitudinal orientation of the fiber particles according to one embodiment of the invention.
Figure 4:
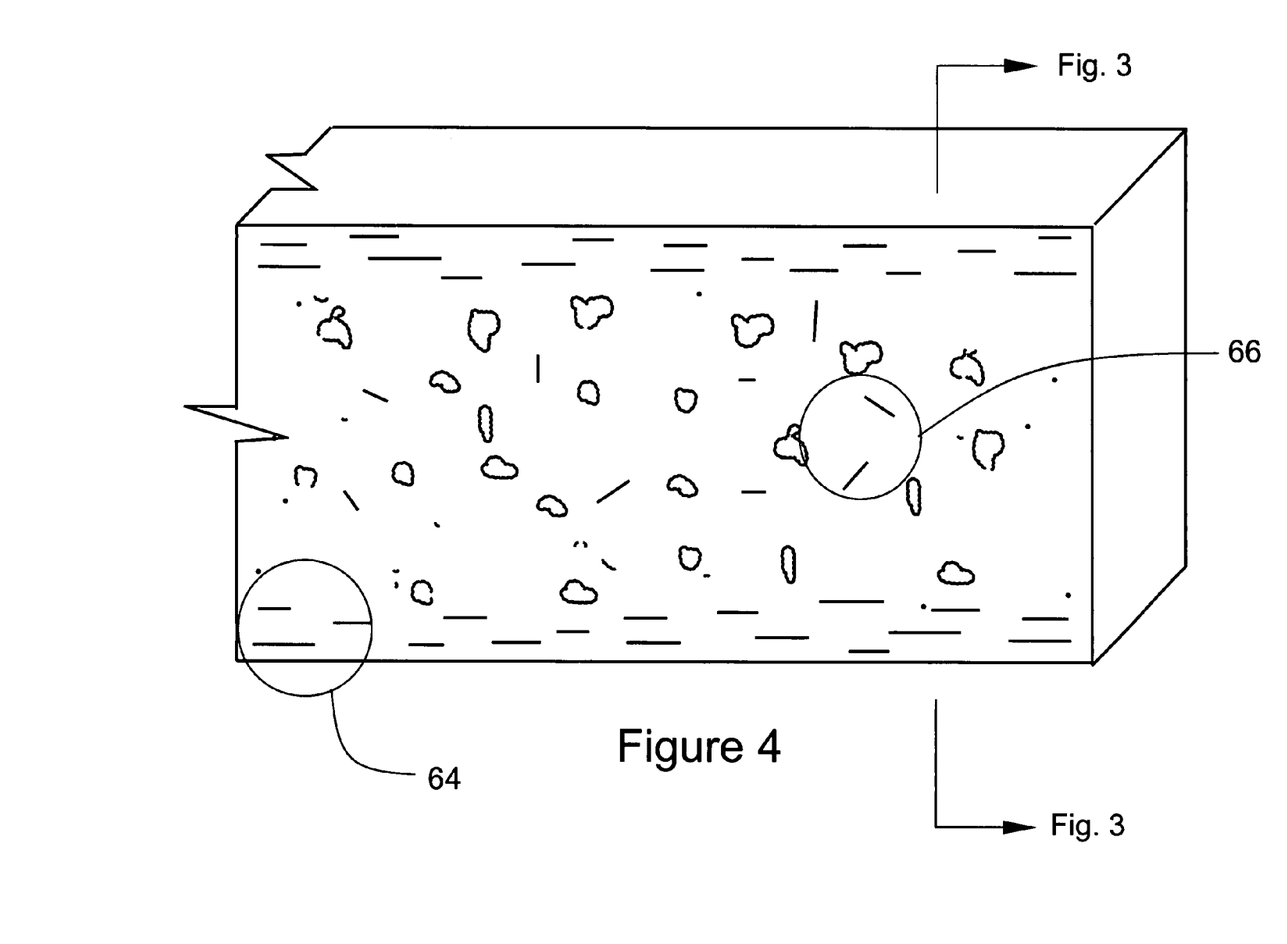
FIG. 4 illustrates a cross sectional front view showing a general longitudinal orientation of fiber particles according to one embodiment of the invention.

FIGS. 3 and 4 illustrates a cross sectional side view showing a general longitudinal orientation of the fiber particles according to one embodiment of the invention. The particles closest to the surface are represented as dots 64 in FIG. 3 showing their longitudinal or lengthwise orientation. The particles closest to the surface are represented as lines 64 in FIG. 4 showing their longitudinal or lengthwise orientation. Other fibers in the center are shown 66, representing their more random orientation.

The longitudinal orientation of the fibers along the surface increases the tensile strength of the final product. This occurs because of the cumulative strengthening effect of the fibers as they are oriented in a common direction.

Figure 5:
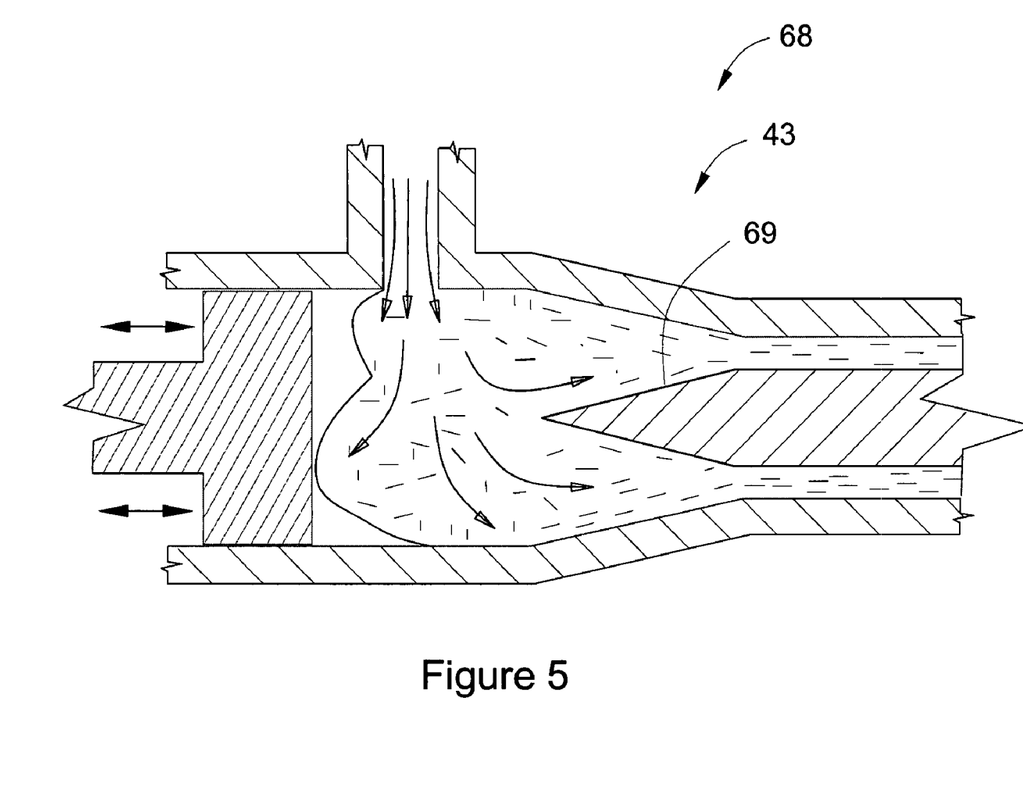
FIG. 5 illustrates a cross sectional side view of an extruder according to one embodiment of the invention.
Figure 6:
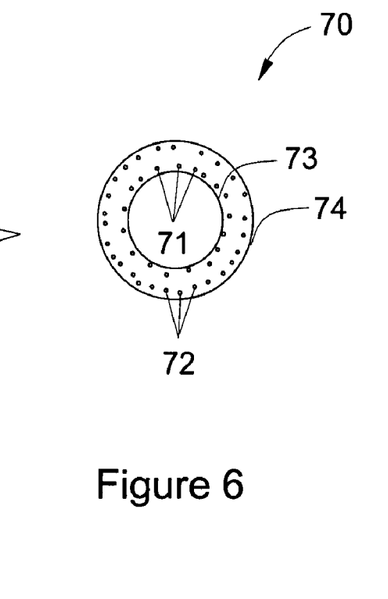
FIG. 6 illustrates a cross sectional side view of a final product created by the extruder illustrated in FIG. 5, according to one embodiment of the invention.

FIG. 5 illustrates a cross sectional side view of an extruder according to one embodiment of the invention. It shows an embodiment 68 that can be used to make pipe-like or tube-like product 70. An internal or center venturi 69 is used to push the molten slurry to the sides where the outer venturi would push it inward. The combination of the two venturi forces would create a donut structure that would result in a pipe or tube as it is extruded. The pipe or tube 70 has the outside surface 74 strengthened by the aligning of its surface fibers 72. The inside surface 73 is also strengthened by the alignment of its surface fibers 71. The final product has both the inner and outer surface having superior tensile strength.

Figure 7:
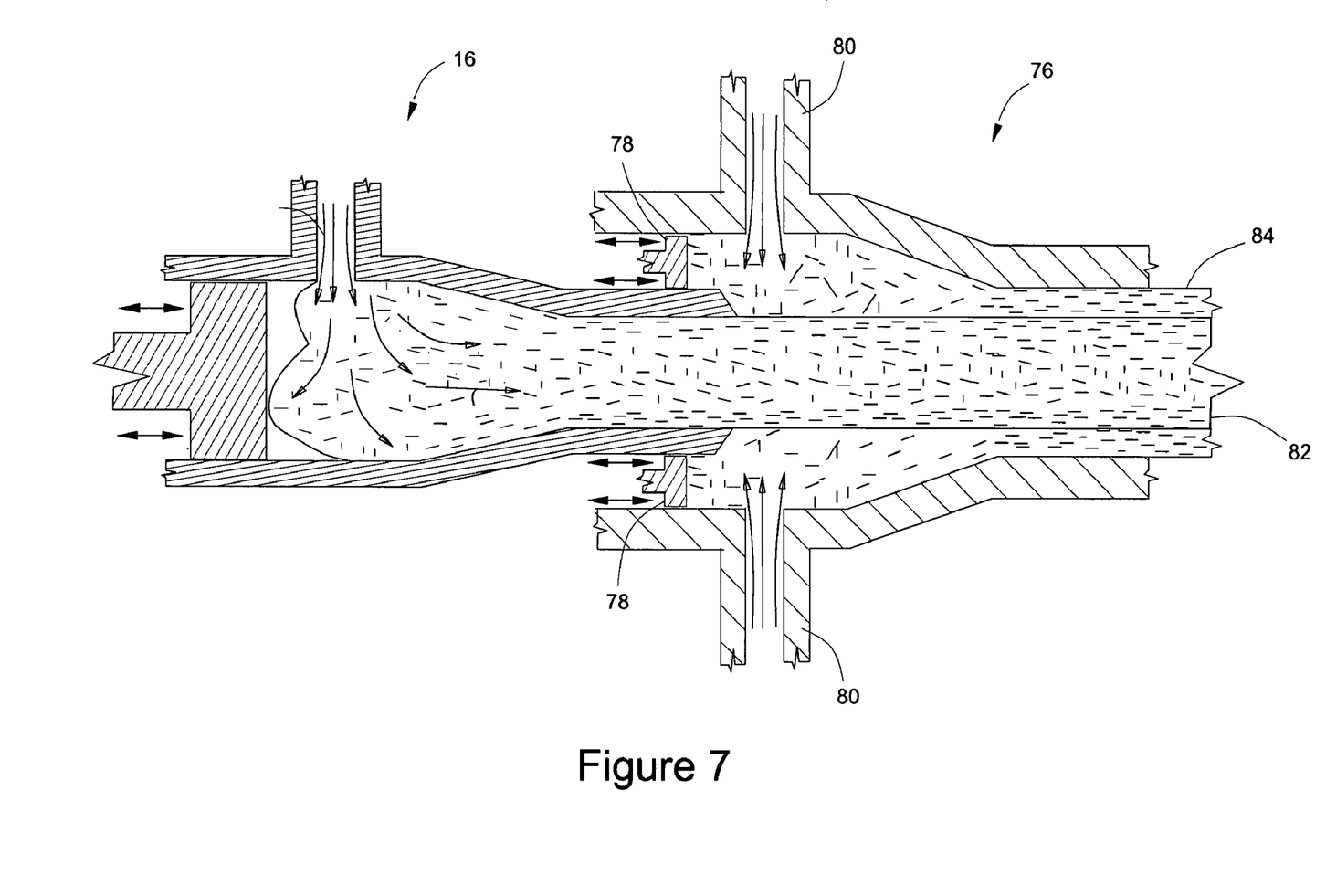
FIG. 7 illustrates a cross sectional side view of a multistage extruder according to one embodiment of the invention.

FIG. 7 illustrates a cross sectional side view of a multistage extruder according to one embodiment of the invention. This illustrates an embodiment of the invention that provides multiple stages of venturi 16, 76 to produce a stronger product. This would require each successive venturi to be a step larger until the desired size is achieved. Any number of stages can be used for increased strength, limited only by size and cost. At each stage additional molten material would need to be added. It is expected that the molten slurry would be injected at locations 80 around the circumference of the $2^{nd}$ or $3^{rd}$ stage venturi 76, preferably at two or more locations. The result is an inner layer of aligned fibers 82 and an outer layer of aligned fibers 84. The piston of the extruder 78 should extend all the way around the previous stage venturi 16.

Figure 8:
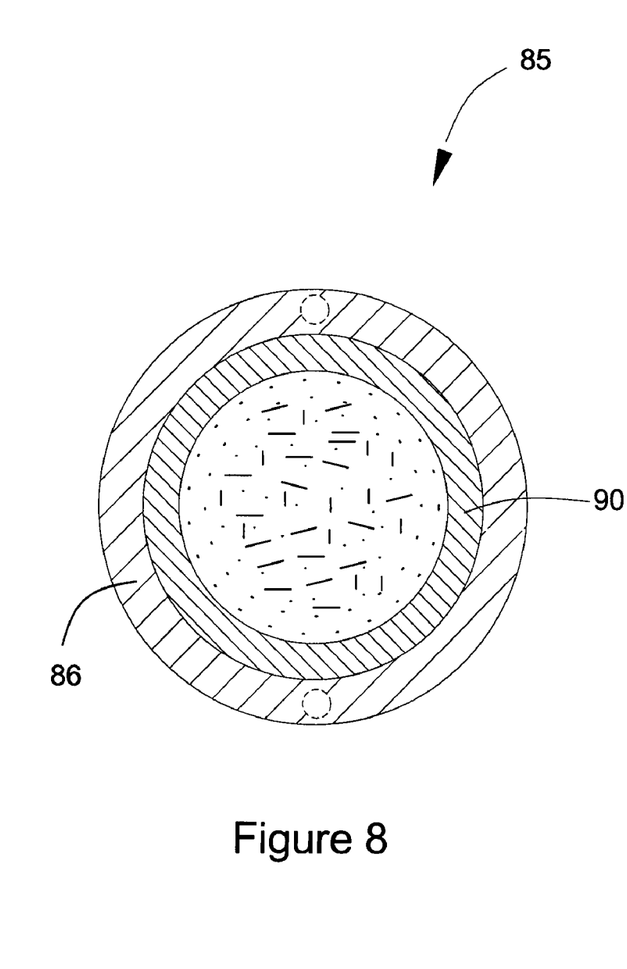
FIG. 8 is a cross sectional side view of an extruder according to one embodiment of the invention.

FIG. 8 is a cross sectional side view of an extruder according to one embodiment of the invention. It shows a cross section of a $2^{nd}$ or $3^{rd}$ stage venturi piston 85. The piston is shown as donut shaped 86. It could be any shape, including but not limited to square, irregular, triangular, and/or rectangular shaped. The previous stage extruder casing 90 is shown. This permits multiple layers of molten slurry to be included in a final product.

Figure 9:
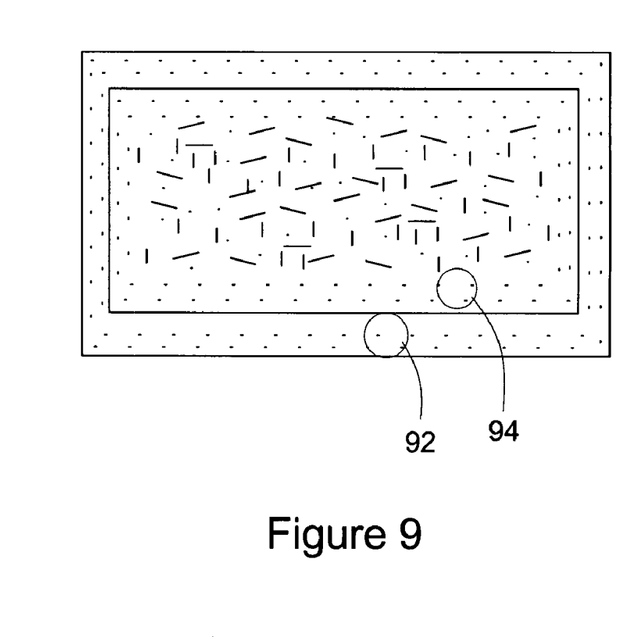
FIG. 9 is a cross sectional side view of a final product according to one embodiment of the invention.

FIG. 9 is a cross sectional side view of a final product according to one embodiment of the invention. It illustrates a cross sectional view of a finished product that has been processed through 2 stages. There is an inner aligning of fibers from the $1^{st}$ stage 94 and an outer aligning of fibers from the $2^{nd}$ nd stage 92. A purpose of the multiple stages is to provide multiple layers of strength for the final product. With the multiple layers of enhanced strength, the final product shows superior strength to many other recycled products.

Figure 10:
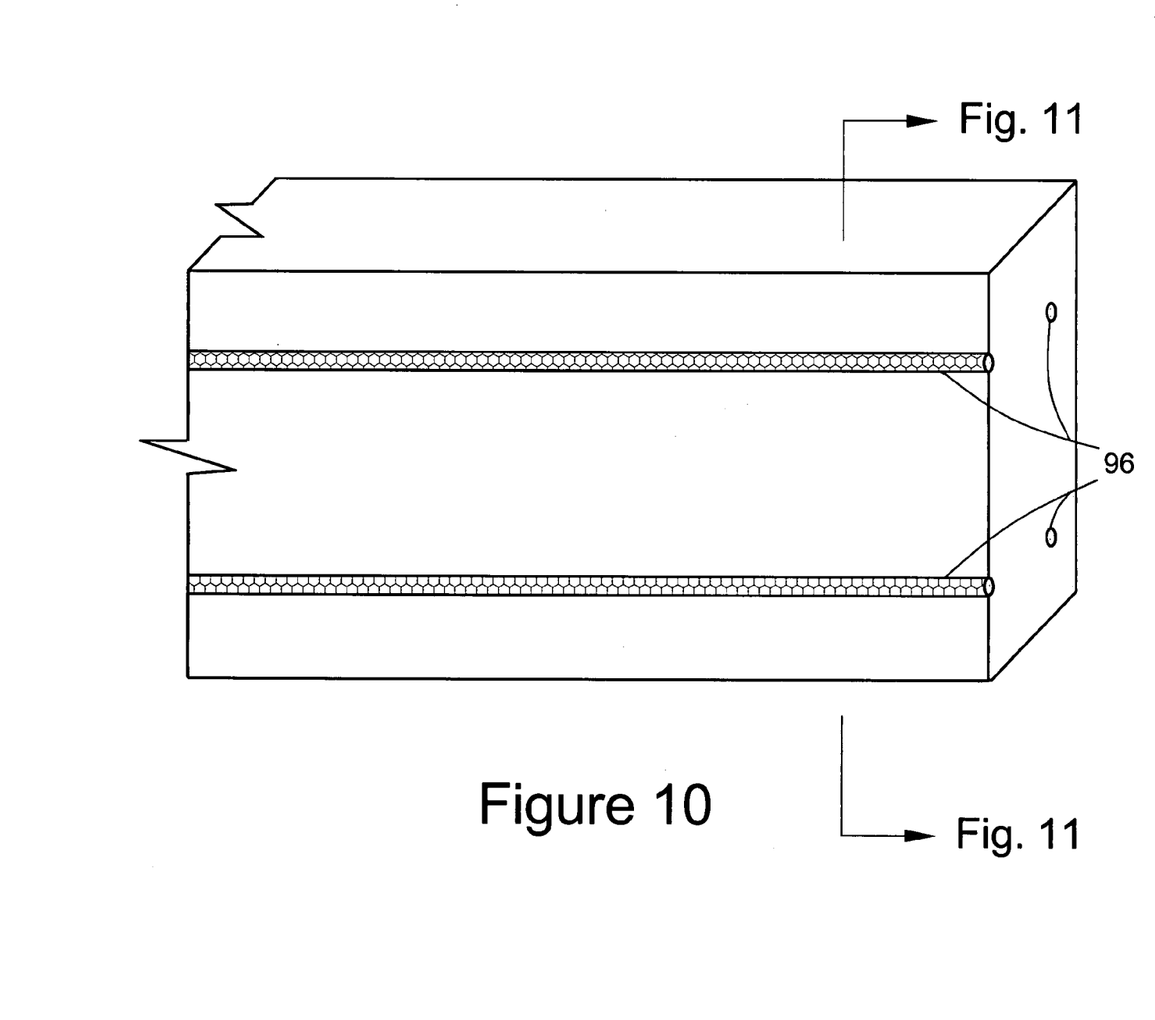
FIG. 10 is a cross sectional side view of a final product according to one embodiment of the invention.

FIG. 10 is a cross sectional side view of a final product according to one embodiment of the invention. It illustrates a final product that runs cables 96 through the length of the product as part of the extrusion process. Cables 96 may enhance tensile strength, adding to the strength produced by the fibers. Cables may be fibers that may be longer than a maximum size of an extrusion cavity.

Figure 11:
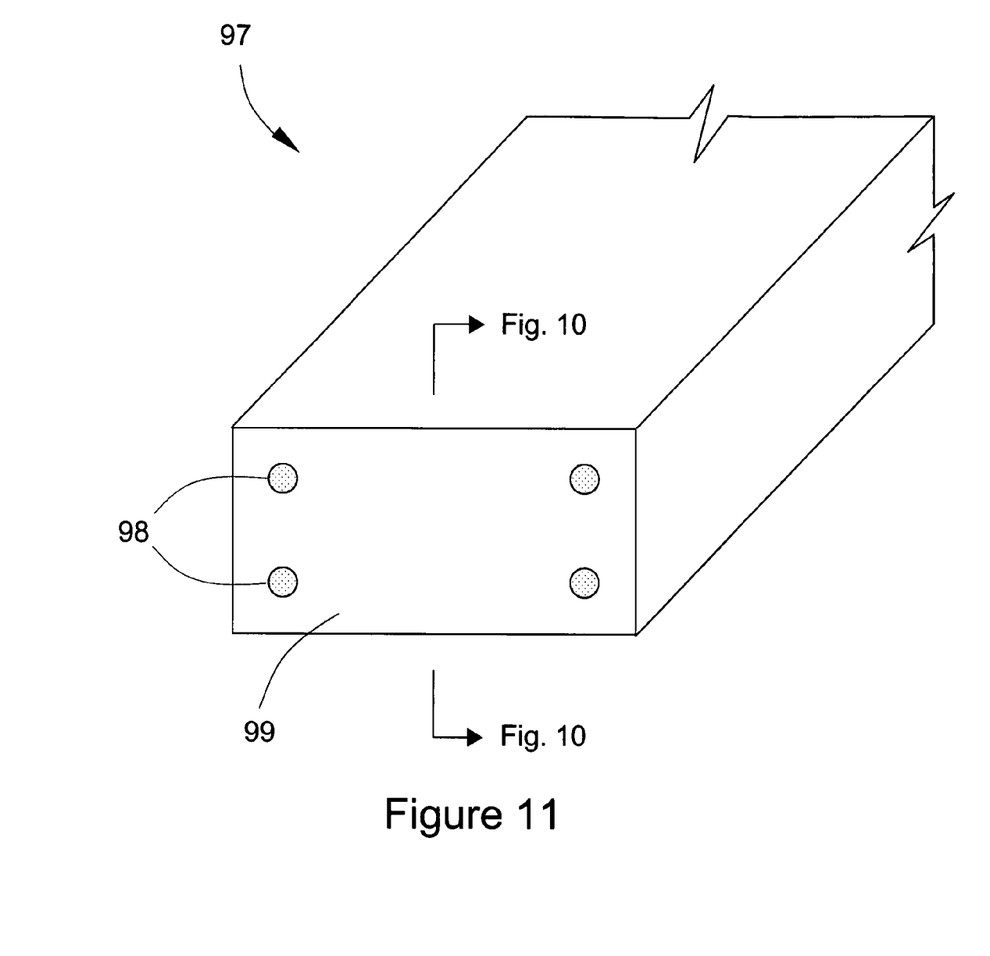
FIG. 11 is a cross sectional front view of a final product according to one embodiment of the invention.

FIG. 11 is a cross sectional front view of a final product according to one embodiment of the invention. It shows a cross sectional view of the product with cables 97. The cables 98 are shown in the cross section 99. There may be any number of cables 98 internal a final product. Cables are preferably adjacent an edge of an extruded product. Unless otherwise required by a particular use of a product it is preferred that cables 96 be included in an extruded product in a symmetrical pattern, thereby enhancing strength similarly in several directions.

Another embodiment would be to add short strands of wire, wherein the strands of wire are included as fibers but may not have been part of the waste stream. Wire strands may be single strands of wire or may be multiple smaller strands woven together. In this manner fiber content and quality may be enhanced. The much stronger fibers may add considerable strength to the final product Another process embodiment would require that the plastic be heated separately to a higher temperate and then injected separately from the garbage stream. This may ensure that all of the plastic would melt, thus preventing cold joints (weaker portions of a product including scraps of un-melted plastic) in a final product.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

It is expected that there could be numerous variations of the design of this invention. An example is that building materials of all sizes and shapes can be constructed from this process.

Finally, it is envisioned that the components of the device may be constructed of a variety of materials that might flow through the waste stream. Further, it is envisioned that machines used in the process may be of varying types. For example, while the application describes using a particular piston-type extruder, other types of extruders may be used as well.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of forming a reinforced building product from garbage, comprising the steps of:
   sorting the garbage by separating the garbage into plastics, fibers, and other materials;
   shredding the plastics to a size configured to facilitate melting;
   shredding the fibers to macroscopic lengths no greater than a maximum internal diameter of a venturi;
   providing sand-sized filler particles;
   heating the plastics to a temperature sufficient to substantially melt the plastic;
   forming a slurry by mixing the heated plastic, the filler and the fibers;
   disposing the slurry within an extrusion cavity, wherein the extrusion cavity includes an extrusion piston and the venturi;
   extruding the slurry through the venturi by actuating the extrusion piston, thereby causing significant alignment of the shredded fibers within the slurry in an outer region of the extruded slurry; and
   allowing the extruded slurry to cool and harden, thereby forming the reinforced building product material; and
   further comprising sanitizing the fibers, wherein the sand-sized filler particles are selected from the group of fillers consisting of sand, rock, and cement and wherein the fibers comprise metal wires.

2. The method of claim 1, further comprising:
   sorting the other materials into fillers and unusables;
   grinding filler material to be sand-sized; and
   mixing the fillers with the heated plastic and the fibers.

3. The method of claim 2, wherein the fillers, heated plastic, and fibers are mixed according to the following ranges:
   from about 30 percent to about 60 percent of heated plastic;

fillers in an amount no greater than 25 percent; and
from about 30 percent to about 60 percent of fibers.

4. The method of claim 1, wherein the venturi is a pipe venturi configured to produce hollow reinforced building product material.

5. The method of claim 1, further comprising the steps of:
providing a plurality of cables having lengths greater than the maximum internal diameter of the venturi disposed lengthwise within the extruded material; and
cutting the reinforced building product material to a desired length.

6. The method of claim 1, further comprising repeating the method a second time using the reinforced building product material resultant from a first time as a core upon which to form a layer of reinforced building product material disposed thereupon by a pipe extruder including a pipe venturi.

7. The method of claim 1, further comprising providing cables having lengths greater than a maximum internal diameter of the venturi and wherein the step of providing sand-sized filler particles includes providing sand.

* * * * *